Jan. 2, 1934.    N. H. NORRIS    1,942,117
ARTICLE SEPARATING AND GRADING APPARATUS
Original Filed March 9, 1931    4 Sheets-Sheet 1
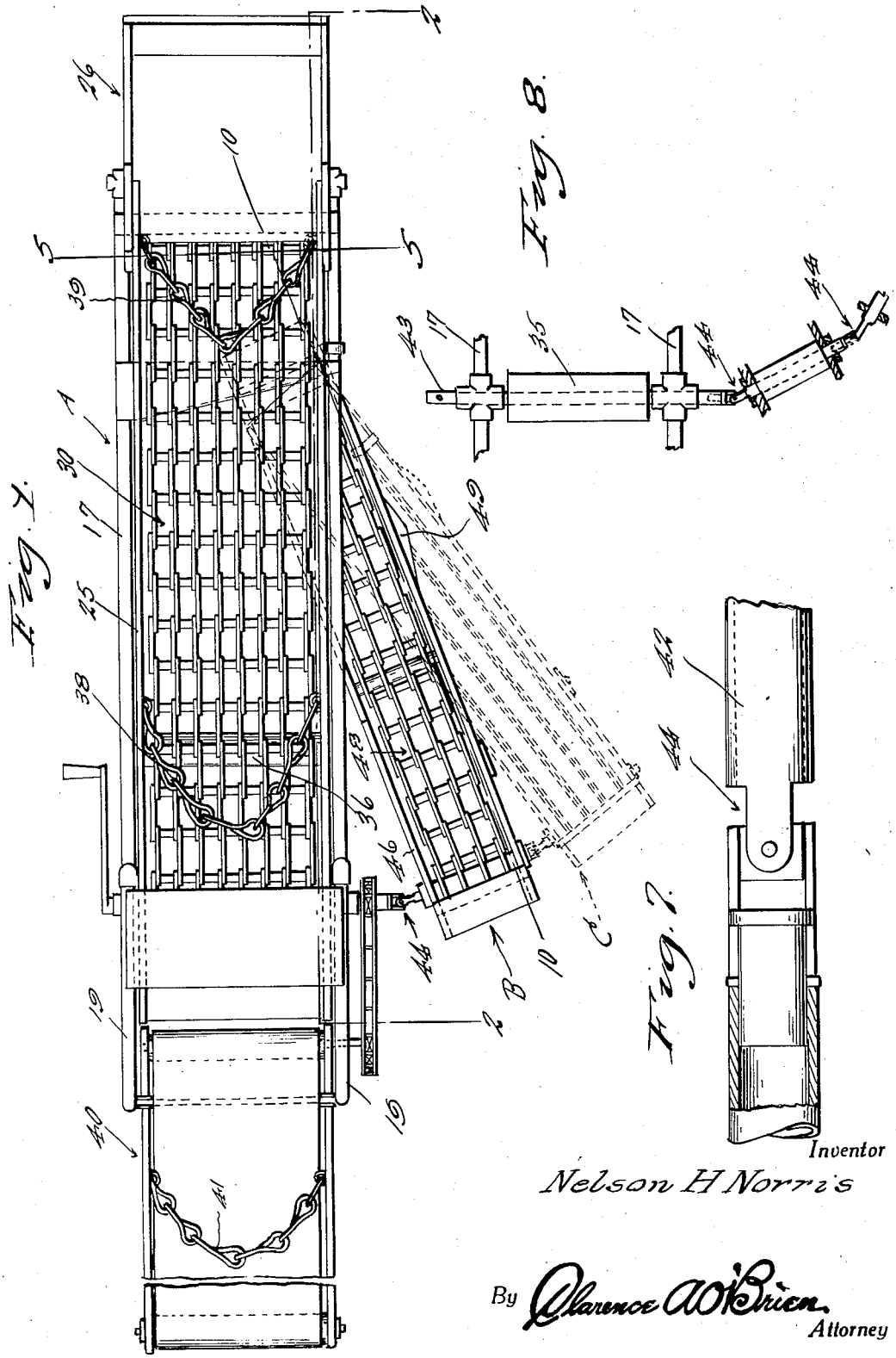
Inventor
Nelson H Norris
By Clarence A O'Brien
Attorney

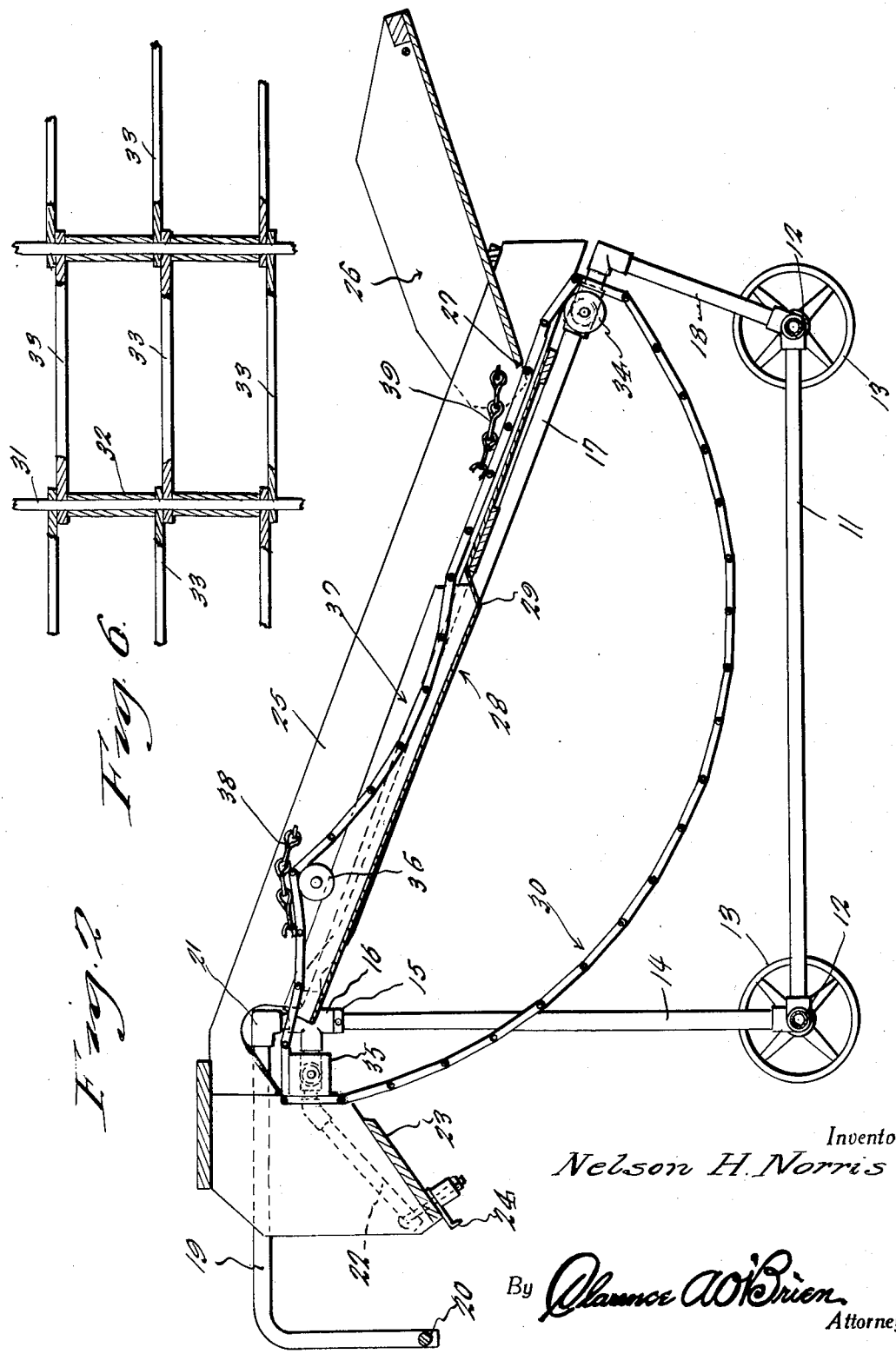

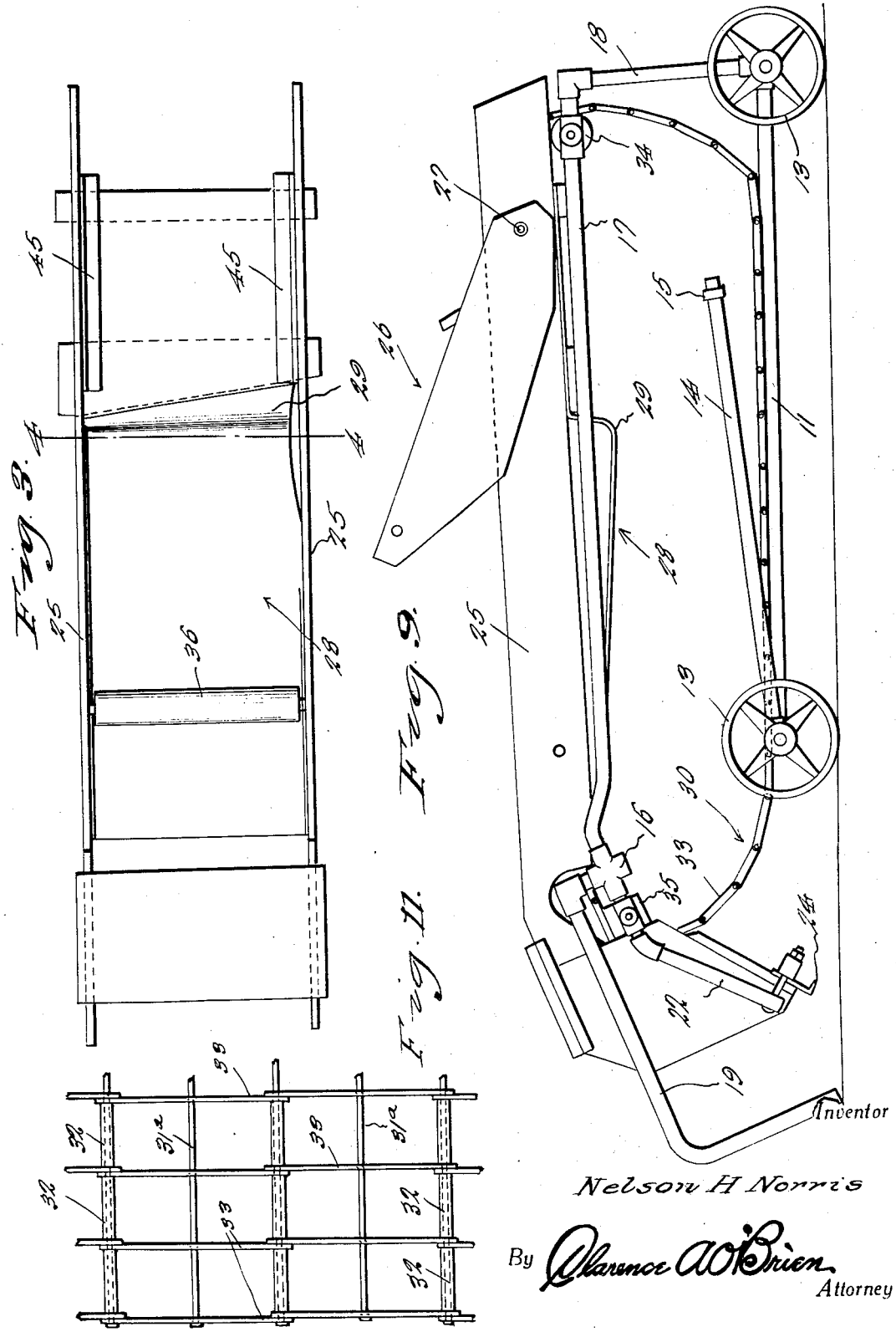

Jan. 2, 1934. N. H. NORRIS 1,942,117
ARTICLE SEPARATING AND GRADING APPARATUS
Original Filed March 9, 1931 4 Sheets-Sheet 4
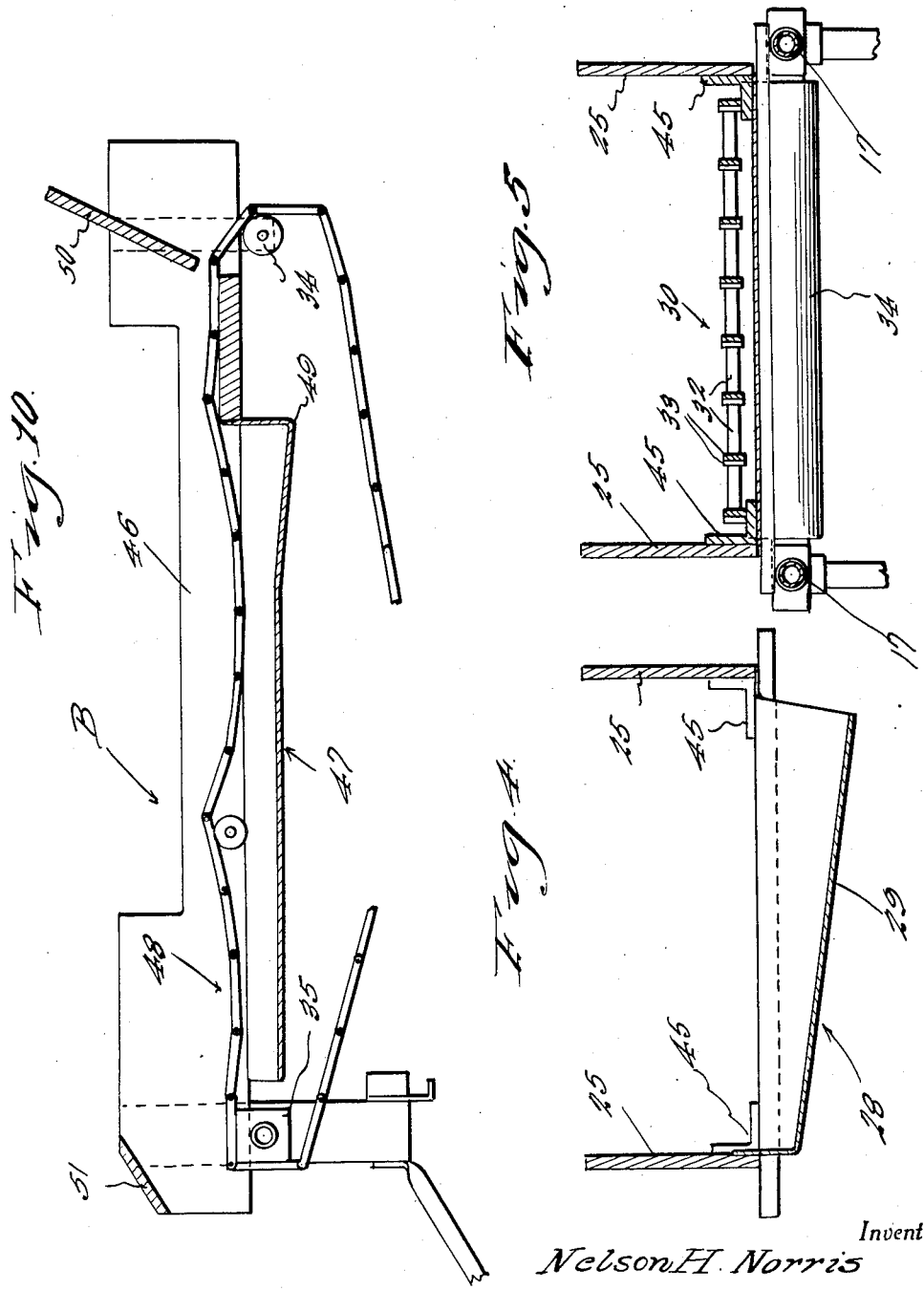
Inventor
Nelson H. Norris
By Clarence A. O'Brien
Attorney Patented Jan. 2, 1934

1,942,117

UNITED STATES PATENT OFFICE 1,942,117

ARTICLE SEPARATING AND GRADING APPARATUS

Nelson H. Norris, Bath, N. Y.

Application March 9, 1931, Serial No. 521,293
Renewed May 3, 1933

4 Claims. (Cl. 209—84)

This invention relates to an improved apparatus for sorting and grading vegetables and fruits and analogous garden produce, and it has more particular reference to a structure which is expressly designed for handling potatoes.

My primary aim is to generally improve upon structures of this general classification by providing a more satisfactory and practical organization of parts such as have been expressly selected to fulfill their respective functions in an efficient and dependable manner.

An important advantage is founded upon a novel ensemble of co-acting graduated graders detachably connected together with their respective discharge ends disposed on approximately the same plane to expedite collection in bags, boxes and analogous containers.

Then too, additional novelty is predicated upon the portable wheel-equipped carriage and frame structure of a foldable type susceptible of being collapsed and easily transported and subsequently stored or for the purpose of taking it in and out of a restricted area.

In the drawings:

Figure 1 is a top plan view of the assembly developed in accordance with the present inventive conception.

Figure 2 is a longitudinal sectional view on the line 2—2 of Figure 1.

Figure 3 is a top plan view of the skeleton form of the confining trough with the belt and chain removed.

Figure 4 is a transverse section on the line 4—4 of Figure 3.

Figure 5 is a transverse section on the line 5—5 of Figure 1.

Figure 6 is a fragmentary sectional and elevational view of the elevating and conveyor belt.

Figure 7 is a detail sectional and elevational view of the separable universal coupling construction.

Figure 8 is a detail plan view of the power transmission or drive between the respective graders.

Figure 9 is a side view of the structure collapsed for transportation and storage purposes.

Figure 10 is a section taken approximately on the plane of the line 10—10 of Figure 1 with the second supplementary grader removed.

Figure 11 is a view in top plan of the structure seen in Figure 6 showing a slight modification in detail assembly.

As before implied, one of the outstanding features of the invention is predicated upon the utilization of a plurality of distinguishable graduated graders united together in proper stepped relationship so that the potatoes are gathered by gravity in collecting pans and shunted from one pan to the next grader in a systematic graduated way so as to expedite sorting.

This result is accomplished by the employment of a predetermined number of grading units starting with the main unit denoted generally by the reference character A in Figure 1, then attaching thereto the second reduced or supplemental unit B and attaching to this the next graduated unit C and so on.

In the arrangement shown however, the intake end of the respective graders B and C are disposed in overlapped formation and the operating devices from several graders are controlled from a single source or supply of power and the discharge ends of all of these devices A, B and C etc., come to and discharge at approximately the same plane. This assembly of inter-communicating angularly related graders forms what I term a fan-shaped ensemble or what might be designated as a co-operating gang of graders proportionately joined together in proper systematic order.

Many of the features of these co-operating graders are common so far as elevating belt and frame structure is concerned. Nevertheless I will first describe the major part of the structure, that is, the primary grader designated generally by A, and in this connection I invite attention to Figure 2. In this figure, it will be noted that this entire part of the structure is portable and in fact includes a foldable frame structure so that it can be collapsed as shown in Figure 9 and transported and stored in an out-of-the-way space of limited area. The base frame includes longitudinal side rails 11 joined to the end axles 12 on which the transporting wheels 13 are mounted.

At the rear end of the structure, I provide a pair of standards 14 which are swingably mounted on and extend vertically from the adjacent axle. On the upper end of each standard is a stop collar 15 and this end portion of the standard fits into a substantially cruciform coupling 16 on the adjacent end of the inclined top rail or pipe of the frame structure.

This arrangement comprising the details 15 and 16 provides a detachable connection allowing the standards 14 to be swung down to the folded state represented in Figure 9. It will be noted in this connection that the rails 17 are joined to relatively short standards 18 which are swingably mounted on the front axles. I also call attention to the bag holder 19 and the connecting members 20 joined by couplings 21 to the aforesaid couplings 16.

Then too, the extension pipes 22 are to be noted, these serving as hangers for the discharge shelf 23. In practice, this part 23 is provided with suitable hangers 24 co-operating with companion hangers on the cross member 20 to provide a suitable bag holder. The bag holder construction however, does not form a part of the present application for patent.

Carried by the inclined upper portion of the wheel-equipped carriage or frame structure is the feedway for the potatoes which may be designated generally as a trough. This includes a pair of side confining walls or boards 25. At the intake end of this trough is a suitable feed hopper 26 which is pivotally mounted as at 27 to permit it to be folded to the position shown in Figure 9 when not in use.

This hopper arrangement facilitates the delivery of potatoes into the intake end of the trough. The bottom of the trough is in the nature of a metal pan generally designated at 28, and intermediate its ends this pan is formed as at 29 to provide what may be designated as a side shunting chute. This is a collecting pan for catching the potatoes passing through the elevating and conveying belt 30.

The belt 30 is of special formation so as to enable it to serve a multiplicity of purposes, that is, of feeding and elevating the potatoes, and sifting the potatoes according to size and in a manner so as not to bruise the potatoes, each section having two or more grading spaces therefor a minimum of joints.

In Figure 6 I have shown a detail section of a portion of the belt and it will be observed that it comprises connecting rods 31 and spacing sleeves 32 interposed between the longitudinal spaced parallel links 33. These links are of elongated bar-like formation each bar having two or more divisions thus reducing joints, and are positioned with respect to the actuating elements of operation on the chain carrying structure.

One of these actuating elements is in the form of a cylindrical pulley 34 at the right hand end of Figure 2. The other roller or element is indicated at 35 and is of polygonal cross-sectional shape. Incidently, it will be observed that the links 33 are rigid and are such as to rock and shift in a peculiar manner over the curvate surface of the cylindrical pulley. Thus as the centers of the links pass pulley 34 a quick shift of the grading belt is effected which causes an intermittent dropping of the sorting belt.

I call attention at this time to a cylindrical idler pulley or roller at 36 which occupies a plane above both of the rollers 34 and 35. In fact, this is located in the upper discharge end portion of the trough and is so positioned above the pan 28 as to allow the portion 37 of the sorting belt to droop down into the pan intermittently as each section of links pass over pulley 35.

The complete length of the belt is such as to allow the underhanging portion to assume a long sweeping loop shape. In fact, this surplus length in the belt allows it to bodily shift in an intermittent manner during its feeding operation. In other words, under this arrangement and due to the arrangement of the driving pulleys and idler pulley, and also due to the particular shape of the links of the belt, the belt moves up a predetermined distance and then due to the weight of the potatoes in the pocketed drooping portion 37 the belt shifts forward momentarily which action causes the potatoes to flip, roll and shift and to turn in such irregular manner as to afford observation and inspection by the nearby attendant.

This intermittent bodily shifting action of the belt with respect to the driving pulleys is highly important. Then too, the arrangement whereby the shallow portion of the pan 28 underlies the drooping portion of the belt is further important. It is understood, in this connection, that those potatoes which pass through the belt above the pan are collected in this pan and gravitate down the pan to the side discharging chute 29 where they are shunted out by gravity into the next grader B whose intake end underlies the chute 29.

I wish to call attention particularly to the free floating chains 38 and 39 arranged about the opposite end portions of the trough and hanging in an irregular and loose manner in the feedway so as to form an obstruction which has a tendency to shift the potatoes and to minimize clogging, and aid in separation and sorting.

Under some circumstances, and whenever desired, I also employ an inspection table as at 40, in Figure 1 which merely comprises an endless conveyor joined to the discharge end of the trough and having a flexible cross chain 41 for the purpose of turning the potatoes for further inspection. When using this take-off table the bagging device is placed at the discharge end of the table.

I might state here that the source of power for operating the pulley 35 as seen in Figure 8 may be of any suitable character. It may be a hand crank, an electric motor drive or a combustion engine drive, whichever is desired. In connection with Figure 8 I wish to call attention to the idea of providing the universal slip joint coupling construction so as to permit the supplemental devices B and C to be added on to develop the so-called fan-shaped assembly of graders of graduated form, with their intake end portions in overlapped relationship and into proper communicating connection so as to permit the continuous gravity feeding operation.

In Figure 7, I have designated an extension 42 on the end of the propeller shaft 43 which has detachable slip joint universal means indicated generally by the reference character 44. The idea here is to merely employ any sort of a coupling drive including a universal joint which will allow the various units to be hooked together in their power transmission relationship and will also allow the units to be adjusted in appropriate angular super-posed relationship to provide for the fan-shaped graduated arrangement.

Referring back to Figures 4 and 5, it will be observed that the reference character 45 designates spaced angle irons on the intake end portion of the trough over which the conveyor travels as indicated in Figure 5.

Each of the supplemental graders is substantially the same in general construction and arrangement as the primary or main grader already described. However, in Figure 10, I have shown the detail assembly and it will be observed that the trough includes side walls 46 and a pan 47 underlying the belt 48 and having the discharge chute 49 at one end.

At the last named end 49 is a stop wall or board 50 to prevent displacement of the potatoes at this end of the trough. At the opposite end is a brace and shield board 51. The means for clamping or suspending the intake end portion of this grader B beneath the chute 29 may vary.

Particular emphasis is to be placed upon the arrangement wherein the co-operative graders are graduated in size both as to weight and proportions as well as to sorting belt construction. The step-by-step fan-shaped interconnected arrangement is highly important in that it provides a means for sorting and grading into several sizes without re-handling. The grading is progressive from one side to the other by delivering the different sizes successively from one pan to the next pan by way of the side shunting and gravitating chutes. This makes the whole operation smooth, systematic, proportionate and suitably progressive from start to finish.

The fact is that this close gang fan-shaped organization affords the desired concentration of mechanism and details and allows the entire work to be attended to by a minimum of persons, placing all grades of the potatoes in full view for observation by the attendant.

The incorporation of the obstruction free acting chains or the like in the various troughs causes the potatoes to roll over and to separate so as to facilitate minute and accurate inspection which is most important.

The idea of having the progressive graders detachably connected together, all operating from the single source of power, and to facilitate dismantling is highly important. Then too, the arrangement wherein the master unit or grader is on a wheel-supported carriage of foldable type to expedite storage and transportation is quite as important, reducing the bulk to a minimum.

From actual practice, it has been found that this mechanically inter-connected gravity acting structure permits grading with a minimum amount of rubbing bruising or cutting of the potatoes, as the potatoes are not subjected to excessive vibration and shifting. This is due to the fact that the belt itself has a momentary retrograde or shifting action, as before stated, due to the link construction and proportioned to the links with respect to the driving pulley.

Reviewed from another angle it will be seen that the novelty is predicated upon a grading machine of a composite structure including a series of distinguishable grading units which are arranged in fan-shaped formation and all driven by a continuous shaft which is permissible by the presence of flexible universal joints. This allows the close-formed overlapping relation of the intake end of the respective units thereby making possible the progressive grading by gravitation without excessive pans or chutes and also affiliating the various graders or units in such a manner that all grading units may be attended to with a minimum amount of effort and number of attendants, the whole operation being continuous and by one handling.

The foregoing features and advantages and many others will doubtless be clear after considering the description in conjunction with the drawings. Therefore, a more lengthy description is regarded as unnecessary.

Minor changes in shape, size, proportions and rearrangement of details such as fall within the meaning and scope of the adjoined claims may be resorted to in actual practice if desired.

Referring to Figure 11, it will be seen that a slight modification in chain construction is resorted to. The arrangement is substantially identical with that shown in Figure 6 except that the links 33 are about twice as long and are braced by bracing cross rods 31a. This is primarily a matter of proportion in the chain construction which is designed to minimize the number of joints in the complete chain.

I claim:

1. A grading device of the class described comprising a number of grading frames arranged in fan-shaped formation with their inlet ends arranged one above the other and their outlet ends spaced apart, an endless grading belt in each frame, a receptacle in each frame for receiving articles passing through the belt thereof, and a chute for each receptacle for conveying the articles therefrom into the frame next below the frame in question.

2. A grading device of the class described comprising a number of grading frames arranged in fan-shaped formation with their inlet ends arranged one above the other and their outlet ends spaced apart, an endless grading belt in each frame, a receptacle in each frame for receiving articles passing through the belt thereof, and a chute for each receptacle for conveying the articles therefrom into the frame next below the frame in question, each frame sloping upwardly from its inlet end to its outlet end.

3. A grading device of the class described comprising a number of grading frames arranged in fan-shaped formation with their inlet ends arranged one above the other and their outlet ends spaced apart, an endless grading belt in each frame, a receptacle in each frame for receiving articles passing through the belt thereof, a chute for each receptacle for conveying the articles therefrom into the frame next below the frame in question, each frame sloping upwardly from its inlet end to its outlet end, and means for causing the upper reach of each belt to shape itself to depending loops over its receptacle.

4. A grading device of the class described comprising a number of grading frames arranged in fan-shaped formation with their inlet ends arranged one above the other and their outlet ends spaced apart, an endless grading belt in each frame, a receptacle in each frame for receiving articles passing through the belt thereof, a chute for each receptacle for conveying the articles therefrom into the frame next below its inlet end to its outlet end, means for causing the upper reach of each belt to shape itself to depending loops over its receptacle, and a transversely extending chain having its ends connected to the side members of each frame and forming a loop resting on the upper reach of the belt of said frame.

NELSON H. NORRIS.